US008504741B2

(12) United States Patent
Kottomtharayil et al.

(10) Patent No.: US 8,504,741 B2

(45) **Date of Patent: *Aug. 6, 2013**

(54) SYSTEMS AND METHODS FOR PERFORMING MULTI-PATH STORAGE OPERATIONS

(75) Inventors: Rajiv Kottomtharayil, Marlboro, NJ (US); Ho-Chi Chen, Marlboro, NJ (US); Manoj Vijayan Retnamma, Ocean, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,025

(22) Filed: Sep. 14, 2012

(65) Prior Publication Data

US 2013/0013883 A1 Jan. 10, 2013

Related U.S. Application Data

(63) Continuation of application No. 12/618,275, filed on Nov. 13, 2009, now Pat. No. 8,296,475, which is a continuation of application No. 11/313,224, filed on Dec. 19, 2005, now Pat. No. 7,620,710.

(51) Int. Cl.
*G06F 3/00* (2006.01)

(52) U.S. Cl.
USPC .................. 710/17; 710/15; 710/16; 710/18; 710/19

(58) Field of Classification Search
None
See application file for complete search history.

(56) References Cited

U.S. PATENT DOCUMENTS

| | | | |
|---|---|---|---|
| 4,296,465 | A | 10/1981 | Lemak |
| 4,445,176 | A | 4/1984 | Burk et al. |
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Henry Tsai
*Assistant Examiner* — Jing-Yih Shyu
(74) *Attorney, Agent, or Firm* — Knobbe Martens Olson & Bear LLP

(57) ABSTRACT

Systems and methods for allocating transmission resources within a computer network are provided. In some embodiments of the invention, communication links may be assigned based on predefined preferences or system configuration to facilitate the transfer of data from one point in the network to another. In other embodiments, system operation may be monitored and communication paths be assigned dynamically based on this information to improve system operation and provide improved failover response, load balancing and to promote robust data access via alternative routes.

14 Claims, 9 Drawing Sheets

180 220 215 Database Master Storage Manager 170 175 200 195 Database Storage Manager 185 Client 190 Prim 197 201 196 Database Storage Manager 186 206 Client Media Agent 133 191 Prim HBA 1 HBA 2 HBA N 235 233 240 2nd 242 2nd 211

(56) References Cited

U.S. PATENT DOCUMENTS 5,226,157 A 7/1993 Nakano et al.
5,239,647 A 8/1993 Anglin et al.
5,241,668 A 8/1993 Eastridge et al.
5,241,670 A 8/1993 Eastridge et al.
5,276,860 A 1/1994 Fortier et al.
5,276,867 A 1/1994 Kenley et al.
5,287,500 A 2/1994 Stoppani, Jr.
5,301,351 A 4/1994 Jippo
5,311,509 A 5/1994 Heddes et al.
5,321,816 A 6/1994 Rogan et al.
5,333,315 A 7/1994 Saether et al.
5,347,653 A 9/1994 Flynn et al.
5,410,700 A 4/1995 Fecteau et al.
5,448,724 A 9/1995 Hayashi
5,491,810 A 2/1996 Allen
5,495,607 A 2/1996 Pisello et al.
5,504,873 A 4/1996 Martin et al.
5,504,882 A * 4/1996 Chai et al. ...................... 714/5.1
5,544,345 A 8/1996 Carpenter et al.
5,544,347 A 8/1996 Yanai et al.
5,559,957 A 9/1996 Balk
5,559,991 A 9/1996 Kanfi
5,598,546 A 1/1997 Blomgren
5,615,392 A 3/1997 Harrison et al.
5,619,644 A 4/1997 Crockett et al.
5,638,509 A 6/1997 Dunphy et al.
5,642,496 A 6/1997 Kanfi
5,673,381 A 9/1997 Huai et al.
5,675,511 A 10/1997 Prasad et al.
5,682,513 A 10/1997 Candelaria et al.
5,687,343 A 11/1997 Fecteau et al.
5,699,361 A 12/1997 Ding et al.
5,719,786 A 2/1998 Nelson et al.
5,729,743 A 3/1998 Squibb
5,737,747 A 4/1998 Vishlitzky et al.
5,751,997 A 5/1998 Kullick et al.
5,758,359 A 5/1998 Saxon
5,761,677 A 6/1998 Senator et al.
5,761,734 A 6/1998 Pfeffer et al.
5,764,972 A 6/1998 Crouse et al.
5,778,395 A 7/1998 Whiting et al.
5,790,828 A 8/1998 Jost
5,805,920 A 9/1998 Sprenkle et al.
5,812,398 A 9/1998 Nielsen
5,813,009 A 9/1998 Johnson et al.
5,813,017 A 9/1998 Morris
5,829,046 A 10/1998 Tzelnic et al.
5,860,104 A 1/1999 Witt et al.
5,875,478 A 2/1999 Blumenau
5,887,134 A 3/1999 Ebrahim
5,901,327 A 5/1999 Ofek
5,905,847 A * 5/1999 Kobayashi et al. ........... 386/265
5,924,102 A 7/1999 Perks
5,933,104 A 8/1999 Kimura
5,950,205 A 9/1999 Aviani, Jr.
5,956,519 A 9/1999 Wise et al.
5,970,233 A 10/1999 Liu et al.
5,970,255 A 10/1999 Tran et al.
5,974,563 A 10/1999 Beeler, Jr.
5,987,478 A 11/1999 See et al.
5,995,091 A 11/1999 Near et al.
6,003,089 A 12/1999 Shaffer et al.
6,009,274 A 12/1999 Fletcher et al.
6,012,090 A 1/2000 Chung et al.
6,021,415 A 2/2000 Cannon et al.
6,021,464 A * 2/2000 Yao et al. ...................... 711/114
6,026,414 A 2/2000 Anglin
6,052,735 A 4/2000 Ulrich et al.
6,076,148 A 6/2000 Kedem et al.
6,094,416 A 7/2000 Ying
6,105,129 A 8/2000 Meier et al.
6,122,668 A 9/2000 Teng et al.
6,131,095 A 10/2000 Low et al.
6,131,190 A 10/2000 Sidwell
6,148,412 A 11/2000 Cannon et al.
6,154,787 A 11/2000 Urevig et al.
6,154,852 A 11/2000 Amundson et al.
6,161,111 A 12/2000 Mutalik et al.
6,167,402 A 12/2000 Yeager
6,185,607 B1 * 2/2001 Lo et al. ........................ 709/213
6,212,512 B1 4/2001 Barney et al.
6,260,069 B1 7/2001 Anglin
6,269,431 B1 7/2001 Dunham
6,275,953 B1 8/2001 Vahalia et al.
6,292,783 B1 9/2001 Rohler
6,301,592 B1 10/2001 Aoyama et al.
6,324,581 B1 11/2001 Xu et al.
6,328,766 B1 12/2001 Long
6,330,570 B1 12/2001 Crighton
6,330,642 B1 12/2001 Carteau
6,343,324 B1 1/2002 Hubis et al.
6,356,801 B1 3/2002 Goodman et al.
6,374,336 B1 4/2002 Peters et al.
6,389,432 B1 5/2002 Pothapragada et al.
6,418,478 B1 7/2002 Ignatius et al.
6,421,711 B1 7/2002 Blumenau et al.
6,487,561 B1 11/2002 Ofek et al.
6,487,644 B1 11/2002 Huebsch et al.
6,519,679 B2 2/2003 Devireddy et al.
6,538,669 B1 3/2003 Lagueux, Jr. et al.
6,542,909 B1 4/2003 Tamer et al.
6,542,972 B2 4/2003 Ignatius et al.
6,564,228 B1 5/2003 O'Connor
6,581,143 B2 6/2003 Gagne et al.
6,597,862 B1 * 7/2003 Saeki et al. ................... 386/295
6,604,149 B1 8/2003 Deo et al.
6,654,825 B2 11/2003 Clapp et al.
6,658,436 B2 12/2003 Oshinsky et al.
6,658,526 B2 12/2003 Nguyen et al.
6,732,124 B1 5/2004 Koseki et al.
6,775,230 B1 * 8/2004 Watanabe et al. ............. 370/228
6,886,020 B1 4/2005 Zahavi et al.
6,925,541 B2 * 8/2005 Yamagami .................... 711/162
7,035,880 B1 4/2006 Crescenti et al.
7,039,777 B2 * 5/2006 Yamagami et al. ........... 711/162
7,065,623 B2 6/2006 Chen et al.
7,080,229 B2 7/2006 Manbert et al.
7,130,970 B2 10/2006 Devassy et al.
7,246,207 B2 7/2007 Kottomtharayil et al.
7,257,257 B2 8/2007 Anderson et al.
7,266,132 B1 9/2007 Liu et al.
7,272,606 B2 9/2007 Borthakur et al.
7,275,103 B1 * 9/2007 Thrasher et al. .............. 709/224
7,277,984 B2 10/2007 Ghosal et al.
7,293,134 B1 * 11/2007 Noland et al. ................ 711/111
7,302,522 B2 11/2007 Khan et al.
7,346,623 B2 3/2008 Prahlad et al.
7,454,569 B2 11/2008 Kavuri et al.
7,539,706 B1 * 5/2009 Campbell ............................. 1/1
7,546,324 B2 6/2009 Prahlad et al.
7,554,910 B2 * 6/2009 Iwata et al. ................... 370/231
7,620,710 B2 * 11/2009 Kottomtharayil et al. .... 709/223
7,685,269 B1 * 3/2010 Thrasher et al. .............. 709/224
7,814,273 B2 * 10/2010 Barrall .......................... 711/114
7,844,701 B2 * 11/2010 Ramany et al. ............... 709/224
7,975,061 B1 7/2011 Gokhale et al.
8,112,543 B2 2/2012 Gokhale et al.
8,281,028 B2 10/2012 Gokhale et al.
8,296,475 B2 10/2012 Kottomtharayil et al.
2002/0042869 A1 4/2002 Tate et al.
2002/0157113 A1 10/2002 Allegrezza
2003/0099237 A1 5/2003 Mitra et al.
2003/0220985 A1 * 11/2003 Kawamoto et al. ........... 709/219
2005/0071390 A1 * 3/2005 Midgley et al. ............... 707/204
2005/0076390 A1 * 4/2005 Klausberger et al. ......... 725/134
2005/0132257 A1 * 6/2005 Gold et al. ...................... 714/47
2010/0064067 A1 3/2010 Kottomtharayil et al.
2012/0151014 A1 6/2012 Gokhale et al.

FOREIGN PATENT DOCUMENTS

EP 0467546 1/1992
EP 0774715 5/1997
EP 0809184 11/1997
EP 0862304 9/1998

| | | |
|---|---|---|
| EP | 0899662 | 3/1999 |
| EP | 0981090 | 2/2000 |
| EP | 1174795 | 1/2002 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 2005/055093 | 6/2005 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEMS AND METHODS FOR PERFORMING MULTI-PATH STORAGE OPERATIONS

RELATED APPLICATIONS

This application is a continuation of U.S. patent application Ser. No. 12/618,275, filed on Nov. 13, 2009, which is a continuation of U.S. patent application Ser. No. 11/313,224, filed Dec. 19, 2005, both of which are hereby incorporated herein by reference in their entireties.

This application is related to the following patents and pending applications, each of which is hereby incorporated herein by reference in its entirety:

U.S. Pat. No. 7,395,282, titled HIERARCHICAL BACKUP AND RETRIEVAL SYSTEM, issued Jul. 1, 2008;

U.S. Pat. No. 7,035,880, titled MODULAR BACKUP AND RETRIEVAL SYSTEM USED IN CONJUNCTION WITH A STORAGE AREA NETWORK, issued Apr. 25, 2006;

U.S. Pat. No. 6,418,478, titled PIPELINED HIGH SPEED DATA TRANSFER MECHANISM, issued Jul. 9, 2002;

U.S. Provisional Application No. 60/460,234, tilted SYSTEM AND METHOD FOR PERFORMING STORAGE OPERATIONS IN A COMPUTER NETWORK, filed Apr. 30, 2003;

U.S. Pat. No. 7,454,569, tilted HIERARCHICAL SYSTEM AND METHOD FOR PERFORMING STORAGE OPERATIONS IN A COMPUTER NETWORK, issued Nov. 18, 2008;

U.S. Provisional Application No. 60/519,526, tilted SYSTEM AND METHOD FOR PERFORMING PIPELINED STORAGE OPERATIONS IN A COMPUTER NETWORK, filed Nov. 13, 2003;

U.S. Pat. No. 7,343,453, tilted HIERARCHICAL SYSTEMS AND METHODS FOR PROVIDING STORAGE A UNIFIED VIEW OF STORAGE INFORMATION, issued Mar. 11, 2008;

U.S. Provisional Patent Application No. 60/752,203, titled SYSTEMS AND METHODS FOR CLASSIFYING AND TRANSFERRING INFORMATION IN A STORAGE NETWORK, filed Dec. 19, 2005;

U.S. Provisional Patent Application No. 60/752,202, titled SYSTEMS AND METHODS FOR UNIFIED RECONSTRUCTION OF DATA IN A STORAGE NETWORK, filed Dec. 19, 2005;

U.S. Provisional Patent Application No. 60/752,201, titled SYSTEMS AND METHODS FOR RESYNCHRONIZING STORAGE OPERATIONS, filed Dec. 19, 2005; and U.S. Provisional Patent Application No. 60/752,197, titled SYSTEMS AND METHODS FOR HIERARCHICAL CLIENT GROUP MANAGEMENT, filed Dec. 19, 2005.

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND

1. Field of the Invention

The invention disclosed herein relates generally to performing storage operations on electronic data in a computer network. More particularly, the present invention relates to performing storage operations across multiple communication paths within a storage operation system.

2. Description of the Related Art

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy "HSM", as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media. In some cases, backup copies may be stored at an offsite location.

Another form of secondary copy is a snapshot copy. From an end-user viewpoint, a snapshot may be thought as an instant image of the primary copy data at a given point in time. A snapshot generally captures the directory structure of a primary copy volume at a particular moment in time, and also preserves file attributes and contents. In some embodiments, a snapshot may exist as a virtual file system, parallel to the actual file system. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that are able to map files and directories to specific disk blocks.

As indicated, both primary and secondary copies of data may be archived, migrated, and/or recovered across various storage devices in the storage operation system. Several communication paths may be utilized to send or retrieve data between a computer device, and a designated storage device. In addition, the existence of various storage resources may provide multiple options for distributing and managing storage data in the storage operation system. Thus, it may be desirable to provide systems and methods that facilitate the distribution of electronic data in a storage operation system.

SUMMARY

Systems and methods for allocating transmission resources within a computer network are provided. In some embodiments of the invention, communication links may be assigned based on predefined preferences or system configuration to facilitate the transfer of data from one point in the network to another. In other embodiments, system operation may be monitored and communication paths be assigned dynamically based on this information to improve system operation and provide improved failover response, load balancing and to promote robust data access via alternative routes.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1A:
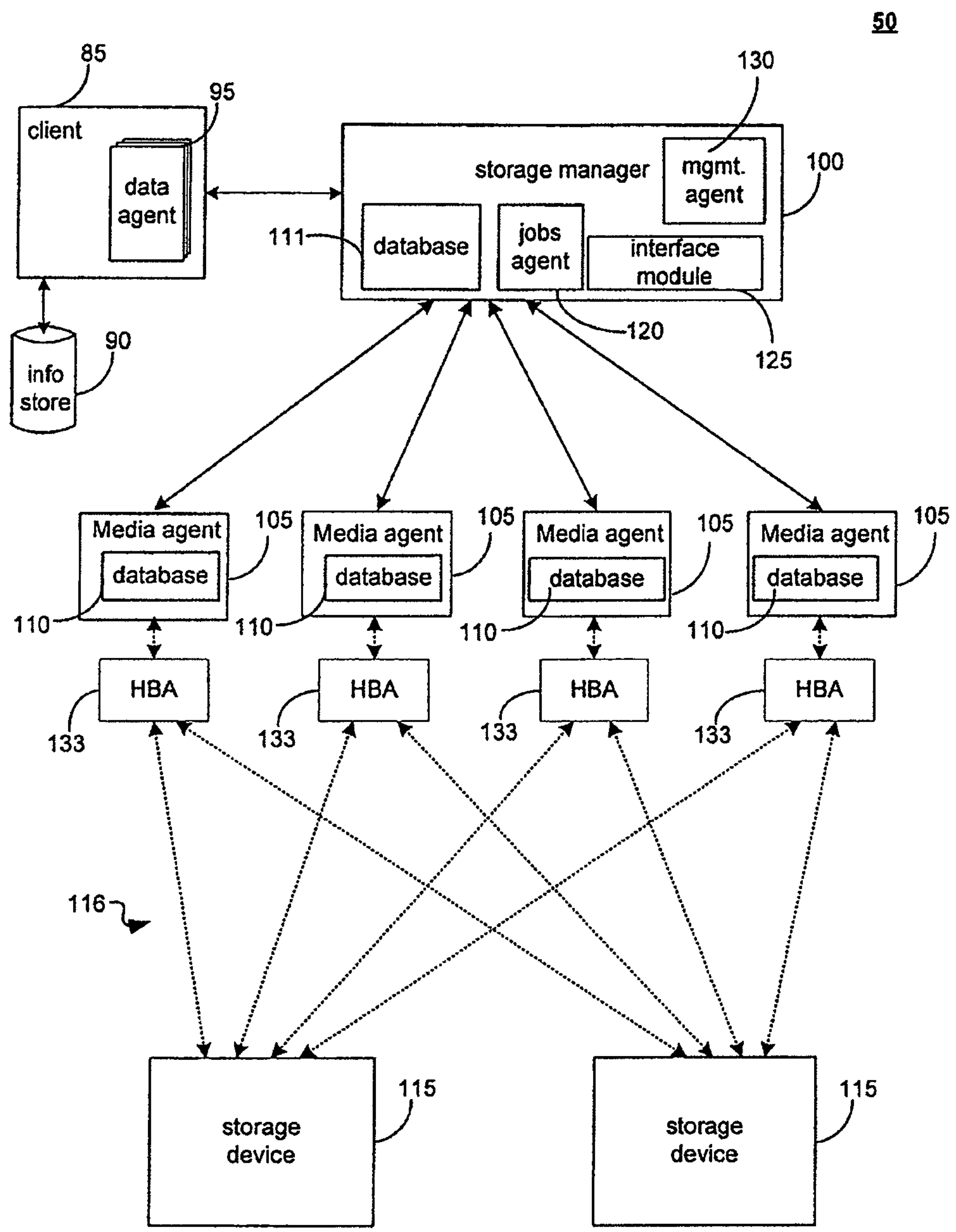
FIG. 1A is a block diagram of a storage operation cell in a system to perform storage operations on electronic data in a computer network according to an embodiment of the invention.

With reference to FIGS. 1 through 6, exemplary aspects of embodiments and features of the present invention are presented. FIG. 1A illustrates a block diagram of a storage operation cell 50 that may perform storage operations on electronic data in a computer network in accordance with an embodiment of the present invention. As shown, storage operation cell 50 may generally include a storage manager 100, a data agent 95, a media agent 105, a storage device 115, and, in some embodiments, may include certain other components such as a client 85, a data or information store 90, databases 110 and 111, jobs agent 120, an interface module 125, a management agent 130. Each media agent 105 may control one or more Input/Output devices such as Host Bus Adaptor (HBA) or other communications link for transferring data from client 85 to storage devices 115 (depicted generally in FIG. 1A as HBA devices 133). Such a system and elements thereof are exemplary of a modular backup system such as the CommVault QINETIX system, and also the CommVault GALAXY backup system, available from CommVault Systems, Inc, of Oceanport, N.J., and further described in U.S. Pat. No. 7,035,880, issued Apr. 25, 2006, which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNET storage management system and the QINETIX storage management system by CommVault Systems of Oceanport, N.J. According to some embodiments of the invention, storage operations cell 50 may be related to backup cells and provide some or all of the functionality of backup cells as described in U.S. Pat. No. 7,395,282, issued Jul. 1, 2008. However, in certain embodiments, storage operation cells may also perform additional types of storage operations and other types of storage management functions that are not generally offered by backup cells.

In accordance with certain embodiments of the present invention, additional storage operations performed by storage operation cells may include creating, storing, retrieving, and migrating primary data copies and secondary data copies (which may include, for example, snapshot copies, backup copies, Hierarchical Storage Management (HSM) copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy may specify when to perform storage operations and how often and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client 85, and other components as described herein. A second storage operation cell may contain the same or similar physical components, however, it may be configured to perform Storage Resource Management (SRM) operations, such as monitoring a primary data copy or performing other known SRM operations.

Thus, as can be seen from the above, although the first and second storage operation cells are logically distinct entities configured to perform different management functions (e.g., HSM and SRM respectively), each cell may contain the same or similar physical devices in both storage operation cells. Alternatively, in other embodiments, different storage operation cells may contain some of the same physical devices and not others. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing and promoting robust data access via alternative routes.

Alternatively, in some embodiments, the same storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that is generally responsible for archiving, migrating, and recovering data from client 85 stored in an information store 90 or other memory location. Each client 85 may have at least one data agent 95 and the system can support multiple clients 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Generally speaking, storage manager 100 may be a software module or other application that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface module 125 (typically a software module or application). Interface module 125 may include information processing and display software, such as a graphical user interface "GUI", an application program interface "API", or other interactive interface through which users and system processes can retrieve information about the status of storage operations. Through interface module 125, users may optionally issue instructions to various storage operation cells 50 regarding performance of the storage operations as described and contemplated by the present invention. For example, a user may employ the GUI to view the status of pending storage operations in some or all of the storage operation cells in a given network or to monitor the status of certain components in a particular storage operation cell (e.g., the amount of storage capacity left in a particular storage device).

Storage manager 100 may also include a management agent 130 that is typically implemented as a software module or application program. In general, management agent 130 provides an interface that allows various management components in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage operation cell 50 and bypasses the storage manager 100 in the second storage operation cell. If desired, storage operation cells 50 can also be organized hierarchically such that hierarchically superior cells control or pass information to hierarchically subordinate cells or vice versa.

Storage manager 100 may also maintain an index cache, a database 111, or other data structure. The data stored in database 111 may be used to indicate logical associations between components of the system, user preferences, management tasks, some SRM or HSM data or other useful data. As further described herein, some of this information may be stored in a media agent database or other local data store according to some embodiments. For example, the storage manager 100 may use data from database 111 to track logical associations between media agents 105 and storage devices 115.

A media agent 105 may be implemented as a software module that conveys data, as directed by storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115 via one or more communication links such as HBA links 133, which can also be referred to as HBA devices 133.

Each HBA link 133 may include multiple HBA communication paths that are associated with one or more media agents 105. HBA link 133 may also communicate data from clients 85 under the supervision of media agents 105 to storage devices 115 via HBA communication paths 116, whereby each HBA link 133 may provide multiple HBA communication paths 116 between each of media agents 105 and storage devices 115. In some embodiments, HBA link 133 may be part of or associated with a storage area network "SAN") and used by various resources with storage operation cell 50 to transfer data to storage devices 115. Various exemplary embodiments associated with the connectivity and communication between media agents 105, HBA link 133, and storage devices 115 are illustrated in FIGS. 1B, 1C, and 1D (discussed in more detail below).

Each media agent 105 may maintain an index cache, a database 110, or other data structure which stores index data generated during backup, migration, and restore and other storage operations as described herein. For example, performing storage operations on Microsoft Exchange data may generate index data. Such index data provides a media agent 105 or other external device with a fast and efficient mechanism for locating data stored or backed up.

Thus, in some embodiments, a storage manager database 111 may store data associating a client computer 85 with one or more media agent(s) 105, HBA link 133, and storage device(s) 115, for example, as specified in a storage policy. Media agent database 110 may include information that indicate specifically where client data is stored in storage device 115, what specific files were stored, and other information associated with storage and retrieval of data from client computer 85. In some embodiments, such index data may be stored along with the data copied to a storage device 115, with an additional copy of the index data written to index cache 110. The data in database 110 is thus generally readily available for use in storage operations and other activities without having to be first retrieved from the storage device 115.

In some embodiments, certain components may reside and execute on the same computer. For example, certain components may execute on a client 85 such as a data agent 95, a media agent 105, or a storage manager 100 which may coordinate and direct local archiving, migration, and retrieval application functions as further described in U.S. Pat. No. 7,035,880, issued Apr. 25, 2006. This client 85 may function independently or together with other similar clients 85. An example of this embodiment is illustrated in FIG. 1.

One arrangement of media agent 105, storage device 115 and HBA link 133 according to an embodiment of the invention is shown in FIG. 1B. As shown, media agent 105 may communicate with storage device 115 through one or more HBA communication paths 116 available in HBA link 133 (illustrated individually as 135*a*, 135*b*, 135*c*). Although three communications links are 116 are shown in FIG. 1B, it will be understood that more can be added if desired and the general purpose is to have at least two communication links from media agent 105 to storage device 115 to provide at least one redundant data path. Moreover, it will be understood that although depicted as separate from media agents 105, in some embodiments, HBA link 133 may be installed in the same computing device that hosts the media agent (e.g., in an ISA or PCI slot, etc.)

The arrangement shown allows for transmission of data from media agent 105 to storage device 115 over multiple communication paths 116. Thus, in operation, if link 116*a* is congested or otherwise unavailable, media agent 105 has two other options for transmitting data to storage device 115 (i.e., paths 116*b* and 116*c*). This represents a significant improvement over prior art systems in which typically only one communications link connected a client to a storage device.

For example, in the case where one more communications paths 116 are inoperable, unavailable or operating at a reduced capacity, other communication paths 116 may be utilized to complete a storage operation (i.e., in a failover case). In addition, if one or more paths 116 are overloaded or constantly busy, media agent 105 and/or storage manager 100 may redistribute jobs among available paths 116 to optimize or otherwise balance the workload among the paths. In some embodiments, such reallocation or redistribution may be performed to meet certain performance goals or to help reduce traffic and congestion on certain data paths. For example, if link 116*a* is scheduled to transmit a 100 MB file while links 116*b* and 116*c* are idle, media agent 105 and/or storage manager 100 may divide the job substantially evenly between them (33 MB each) or in a manner necessary to avoid an error or transmission problem (e.g., a time out condition) or cause undue reassembly or storage operations at storage device 115.

Moreover, such redistribution may be performed on an ongoing basis in an effort to optimize overall system performance or to conform with predefined parameters or expectations. For example, storage manager 100 and/or media agent 105 may monitor the job queue of each HBA device and dynamically reallocate transmission tasks as necessary to ensure compliance with system operating parameters, data security, load balancing preferences or other conditions. For example, a certain transmission system may be specified to operate at no more than 70% transmission capacity to comply with predefined operating conditions. If storage manager 100 and/or media agent 105 determine a certain communications path 116 is or is likely to exceed this threshold, some of its workload may be transferred to other paths 116 (which, in some embodiments, may involve routing to another media agent 105 or storage operation cell 50). Furthermore, this arrangement provides failover capabilities such that in the occurrence of an HBA link failure, storage device unavailability, media management component problem may be addressed by switching to a redundant HBA device, communication link, and storage device.

Another embodiment of the present invention is depicted in FIG. 1C. As shown, media agent 105 may be coupled to storage devices 115*a-c* via HBA links 135*a-c*, respectively. This arrangement provides similar failover and alternate routing options as described above and provides access to multiple storage devices 115. For example, with this arrangement, a problem or failure associated with HBA link 135*a*, and/or communication path 116*a*, or storage device 115*a* may be overcome by assigning HBA device 135*b*, communication link 116*b*, and storage device 115*b* to the task of transferring client data between media agent 105 and available storage such as storage device 115*b*. Similarly, problems associated with HBA device 135*a*, communication link 116*a*, or storage device 115*a* may also be remedied by assigning HBA device 135*c*, communication link 116*c*, and storage device 115*c* to media agent 105, etc.

Under certain other network conditions, it may be desirable to employ certain data allocation or routing techniques, such as load balancing, in order to more evenly distribute data over the storage resources within a storage operation network. For example, if the storage capacity of a given storage device reaches a set threshold (e.g., 80% of storage capacity), as defined by one or more storage policies, two or more of HBA links 135*a*, 135*b*, and 135*c* and storage devices 115*a*, 115*b*, and 115*c* may be assigned to media agent 105 for facilitating a more even distribution and transfer of data to storage.

For example, in addition to HBA device 135*a* and storage device 115*a*, HBA device 135*b* and storage device 115*b* may also be assigned to the task of storing data under the direction of media agent 105. In order to distribute the data load more evenly between storage devices 115*a* and 115*b*, more storage data may be sent to storage device 115*b*, whereby the data distribution ratio or amount directed to storage devices 115*a* and 115*b* may be determined by storage policy information. Storage policy information may, for example, include storing data to other storage devices once a particular storage device has reached a certain capacity threshold. For example, if storage device 115*a* reaches 80% of its total storage capacity, media agent 105 may direct data to either or both storage devices 115*b* and 115*c* via HBA device 135*b* and HBA device 135*c*, respectively.

Thus, the utilization of additional HBA device 135*b* and storage device 115*b* may provide load-balancing capabilities for promoting a more uniform utilization of storage resources within the storage operation system. It may also, for example, be desirable to assign the use of all three HBA links 135*a*, 135*b*, 135*c* and their respective communication paths 116*a*, 116*b*, 116*c* between media agent 105 and storage devices 115*a*, 115*b*, and 115*c*. For example, according to another storage policy, data arriving at media agent 105 may be substantially evenly distributed to storage devices 115*a*, 115*b*, and 115*c* via HBA devices 135*a*, 135*b*, and 135*c*.

FIG. 1D illustrates the exchange of electronic data between a media agent 105, a HBA device 133, and storage devices 115*a*, 115*b*, and 115*c* according to yet another embodiment of the invention. In this exemplary embodiment, media agent 105 may communicate with storage devices 115*a*, 115*b*, and 115*c* through HBA links 135*a*, 135*b*, 135*c*, respectively. Moreover, each HBA device may include redundant communication paths to other storage devices. For example, in addition to HBA link 135*a* communicating with storage device 115*a* via communication path 116*a*, HBA device 135*a* may also communicate with storage devices 115*b* and 115*c* via communication paths 117*a* and 118*a*, respectively. Similarly, in addition to HBA link 135*b* communicating with storage device 115*b* via communication path 117*b*, HBA link 135*b* may also communicate with storage devices 115*a* and 115*c* via communication paths 116*b* and 118*b*, respectively. Also, HBA device 135*c* may communicate with storage device 115*c* via communication path 118*c*, and additionally communicates with storage devices 115*a* and 115*b* via communication paths 116*c* and 117*c*, respectively.

In accordance with one aspect of the present invention, the incorporation of HBA links 135*a*, 135*b*, and 135*c* between media agent 105 and storage devices 115*a*, 115*b*, and 115*c* may provide failover capabilities by providing alternate data paths such that an HBA device failure, storage device unavailability, or media management component problem may be addressed by dynamically switching to a redundant HBA device, media management component, and storage device.

For example, a problem or failure associated with HBA device 135*a*, communication link 116*a*, or storage device 115*a* may be remedied by assigning HBA device 135*b*, communication link 117*b*, and storage device 115*b* for transferring client data between media agent 105 and available storage such as storage device 115*b*. Similarly, problems associated with HBA device 135*a*, communication link 116*a*, or storage device 115*a* may also be remedied by assigning HBA device 135*c*, communication link 118*c*, and storage device 115*c* to media agent 105 and vice versa.

In accordance with another aspect of the present invention, the additional communication paths associated with each HBA device may provide the capability of using an individual HBA link to send and receive data between other storage devices based on the occurrence of a problem or failure associated with a primary communication link or primary storage device utilized by the individual HBA device.

For example, if HBA device 135*a* encounters a problem sending data to storage device 115*a*, HBA device 135*a* may also send the data over redundant communication links 117*a* and 118*a* to storage devices 115*b* and 115*c*, respectively. Similarly, if HBA device 135*b* encounters a problem sending data to storage device 115*b*, HBA device 135*b* may send the data over redundant communication links 116*b* and 118*b* to storage devices 115*a* and 115*c*, respectively. Likewise, if HBA device 135*c* similarly encounters a problem sending data to storage device 115*c*, HBA device 135*c* may then send the data over redundant communication links 116*c* and 117*c* to storage devices 115*a* and 115*b*, respectively.

During the use of certain data allocation or routing techniques, such as load balancing, each of the individual HBA devices 135*a*, 135*b*, 135*c* may distribute the data load to storage-devices 115*a*, 115*b*, and 115*c* via their respective redundant communication links. For example, HBA device 135*a* may distribute data between storage devices 115*a*,

115*b*, and 115*c* over communication links 116*a*, 117*a*, and 118*a*, respectively, according to alternate path definitions established in a storage policy. Similarly, NBA device 135*b* may distribute data between storage devices 115*a*, 115*b*, and 115*c* over communication links 116*b*, 117*b*, and 118*b*, respectively, according to certain alternate path definitions established in a storage policy. Also, HBA device 135*c* may distribute data between storage devices 115*a*, 115*b*, and 115*c* over communication links 116*c*, 117*c*, and 118*c*, respectively, according to defined storage policies.

Thus, load balancing may be provided by utilizing either or both of multiple HBA devices 135*a*, 135*b*, and 135*c*, and the communication links associated with each individual HBA device (e.g., links 116*a*, 117*a*, and 118*a* associated with HBA device 135*a*). It may therefore, for example, be possible to provide load balancing using a combination of both the redundant communication links connecting each HBA device to storage devices 115*a*, 115*b*, and 115*c*, and the multiple HBA devices 135*a*, 135*b*, 135*c* assigned to media agent 105.

Figure 2:
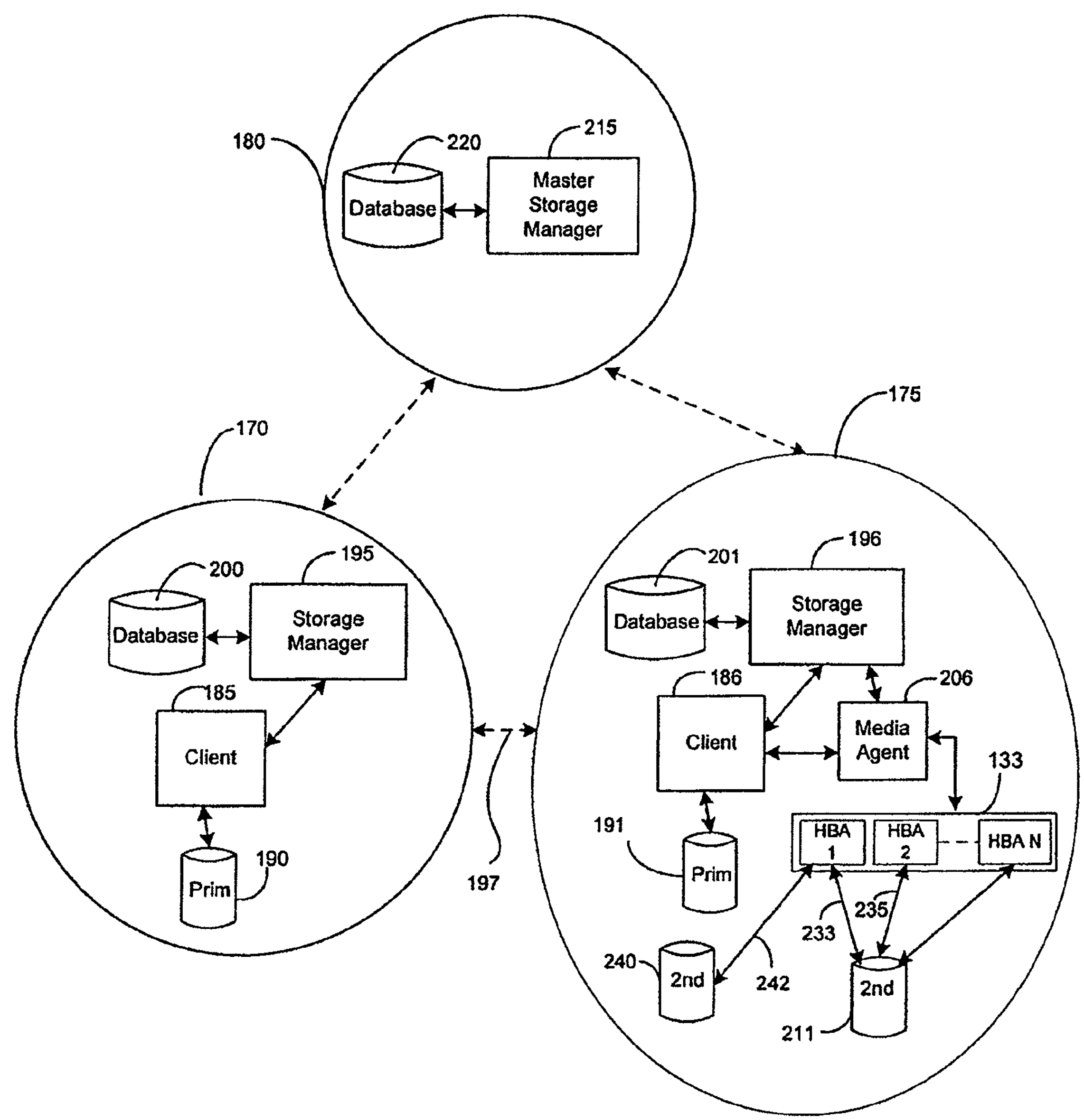
FIG. 2 is a block diagram of a hierarchically organized group of storage operation cells in a system to perform storage operations on electronic data via multiple host bus adapters in a computer network according to an embodiment of the invention.

FIG. 2 is a block diagram of a hierarchically organized group of storage operation cells in a system to perform storage operations on electronic data via multiple host bus adapters in a computer network according to an embodiment of the invention. As shown, FIG. 2 includes a first storage operation cell 170, a second storage operation cell 175, a third storage operation cell 180. Within first storage operation cell 170, a client 185 may be in communication with a primary volume 190 for storing data, and a storage manager component 195 may be in communication with a storage manager database 200. Within storage operation cell 175, a media agent 206 may be in communication with a secondary storage volume 211 via a plurality HBA devices 133, and within storage operation cell 180, a master storage manager component 215 may be in communication with a master storage manager database 220.

The first storage operation cell 170 may be configured to perform a particular type of storage operation, such as SRM storage operations. For example, the first storage operation cell 170 may monitor and perform SRM-related calculations and operations associated with primary copy data. Thus, the first storage operation cell 170 includes a client component 185 in communication with a primary volume 190 for storing data. For example, client 185 may be directed to using Exchange data, SQL data, Oracle data, or other types of production data used in business applications or other applications for storing in primary volume 190. Client 185 may also generate metadata based on the production data. Storage manager component 195 may contain SRM modules or other logic directed to monitoring or otherwise interacting with attributes, characteristics, metrics, and other information associated with the data stored in primary volume 190. Storage manager 195 may track and store this and other information in storage manager database 200 which may include index information. For example, in some embodiments, storage manager component 195 may track or monitor the amount of available space and other similar characteristics of data associated with primary volume 190. In some embodiments, storage manager component 195 may also issue alerts or take other actions when the information associated with primary volume 190 satisfies certain criteria, such as alert criteria. In some embodiments, this may also include other storage managers, media agents and databases.

Second storage operation cell 175 may be directed to another type storage operation, such as HSM storage operations. For example, the second storage operation cell 175 may perform backups, migrations, snapshots, or other types of HSM-related operations known in the art. For example, in some embodiments, data is migrated from faster and more expensive storage such as magnetic storage (i.e., primary storage) to less expensive storage such as tape storage (i.e., secondary storage).

Thus, the second storage operation cell 175 includes client component 186 in communication with the primary volume 191 storing data. In some embodiments, client component 186 and primary volume 191 are the same physical devices as the client component 185 and primary volume 190 in the first storage operation cell 170. Similarly, in some embodiments, the storage manager component 196 and database 201 (which may include index information) in the second storage operation cell 175 are the same physical devices as the storage manager component and index in the first storage operation cell 170. Storage manager component 196, however, typically also contains HSM modules or other logic associated with the second storage operation cell 175 directed to performing HSM storage operations on primary volume 191 data.

Storage operation cell 175 may also contain media agent 206, HBA devices 133, and a secondary storage volume 211 configured to performing HSM-related operations on primary copy data. For example, storage manager 196 may migrate primary copy data from primary volume 191 to secondary volume 211 using media agent 206 and HBA devices 133. Storage manager 196 may also track and stores information associated with primary copy migration and other similar HSM-related operations in storage manager database 201. For example, in some embodiments, storage manager component 196 may direct HSM storage operations on primary copy data according to a storage policy associated with the primary copy 191 and stored in the database 201.

According to this and/or other storage policies, load balancing of migrated data from primary volume 191 to secondary storage volume may be provided using one or more of HBA links 133. For example, migrated data from primary volume 191 may be sent to secondary storage volume 211 via HBA 1 and HBA 2, thus, reducing the transmission burden any one of communication links 233 and 235. Moreover, the use of more than one HBA device may provide additional buffering capacity which may reduce processing and storage demands on the underlying host system running the storage operations or cells 170, 175, and/or 180. Such additional buffering capacity may reduce potential data bottlenecks and data congestion between storage operation system components. Moreover, if for example, HBA 1 or communication link 233 should fail, HBA 2 may be assigned to take over the migration of data from primary volume 191 to secondary storage volume 211.

According to another embodiment, data migrated from primary volume 191 may be sent to secondary storage volume 240 via HBA 1 based certain on load balancing criteria that may be associated with storage policies stored in database 201. According to this criteria, if storage volume 211 does not posses sufficient storage resources, HBA 1 may be directed by media agent 206 to migrate the data from primary volume 191 to alternative secondary volume 240. Similarly data may also be migrated from primary storage volume 190 in storage operation cell 170 to secondary storage volume 211 in storage operation cell 175. As previously described, HBA links 133 may provide load balancing and/or failover capabilities for any data communicated between media agent 206 and storage devices 211 and 240.

Storage operation cell 180 may include a master storage manager 215 and a database 220. In some embodiments (not shown), additional storage operation cells may be located hierarchically in between storage operation cell 180 and storage operation cells 170 and 175. Moreover, in some embodiments, additional storage operation cells hierarchically superior to operation cell 180 may also be present in the hierarchy of storage operation cells.

In some embodiments, storage operation cells 170 and 175 may be connected by communications link 197, which may be any suitable communications link such as a fiber channel or SCSI connection that allows cells 170 and 175 to communicate directly with one another (i.e., without necessarily directly or indirectly involving storage cell 180). This may be accomplished, for example, by storage manager 195 communicating with storage manager 196 via link 197. This allows cells 170 and 175 to share information such as status or storage network operational characteristics to one another such as availability on primary or secondary storage, trigger events based on such information, etc. This allows for the direct transfer of stored data to and from the cells (via link 197) without the need to communicate with or pass data through master storage manager 215. For example, based on storage policy and/or network operational characteristic information communicated from other storage operation cells, storage manager 196 may determine how to allocate HBA devices 133 (e.g., HBA 1, HBA 2, HBA n) between data storage devices 211 and 240.

Figure 3:
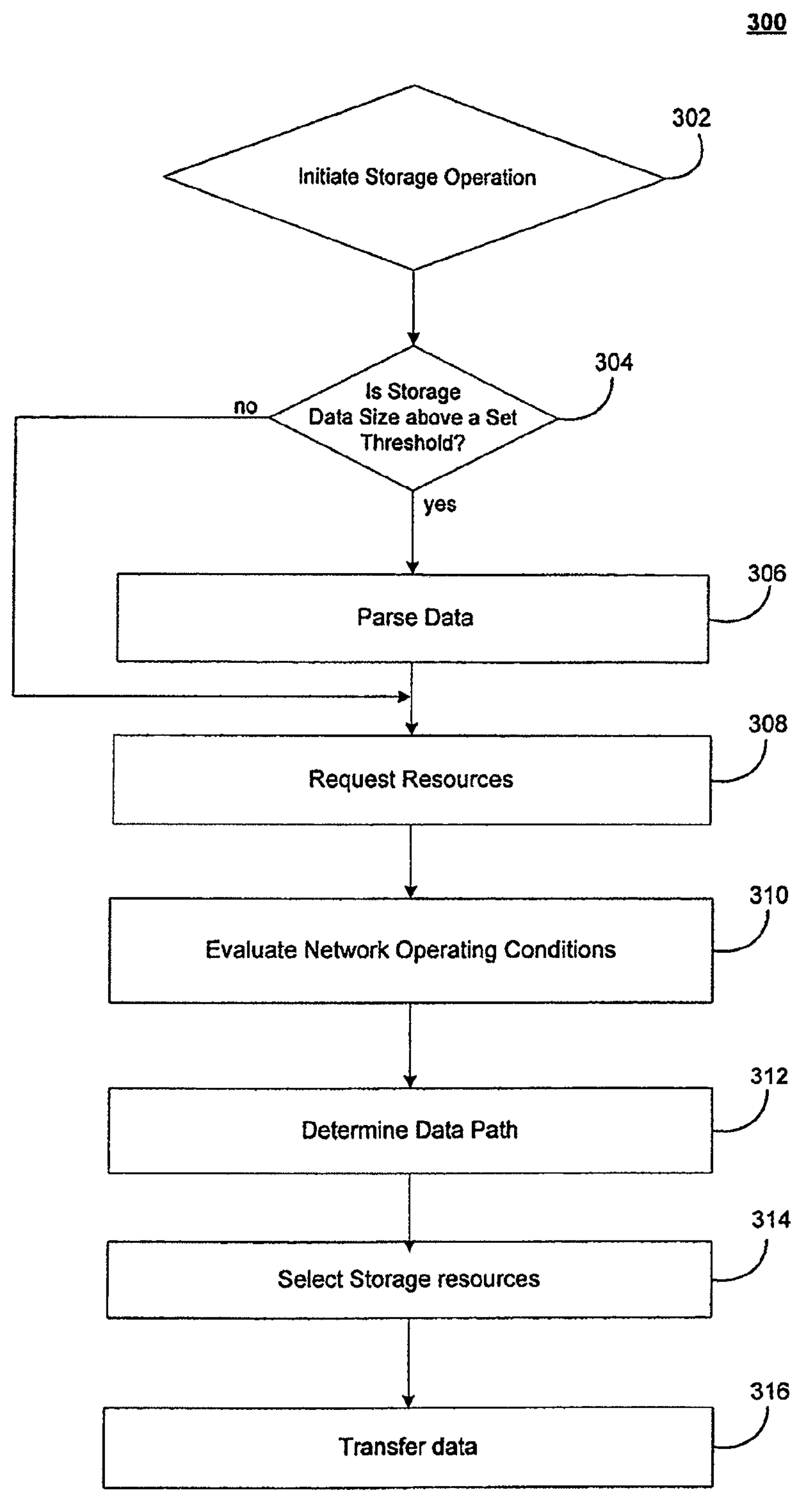
FIG. 3 is a flow diagram of a general method of storing electronic data to one or more storage devices via host bus adapter devices within a storage operation system according to an embodiment of the invention.

FIG. 3 is a flow diagram 300 generally illustrating a method of storing electronic data to one or more storage devices via one or more HBA links according to an embodiment of the invention. At step 302, it may be determined whether certain data is to be copied or migrated from a client computer to a storage device (e.g., primary or secondary) based on conditions defined in a storage policy. If, at step 302, data is scheduled for such a storage operation, the size of the data may be evaluated to determine the resources required to transfer the data (step 304). For example, the size of the data may be compared to certain preset values established in a storage policy or in a media management component to determine resources and/or time required to transfer the data.

If the size of the data is above a predetermined threshold value, certain software components within the system such as a data agent deployed on a client or management component may parse the data to be moved into smaller data units (step 306) prior to proceeding to step 308. At step 308, a data agent may request transmission and routing resources from the storage manager for performing the storage operations on the client data. Based on this request, the storage manager may analyze or otherwise evaluate network operating conditions (step 310) prior to determining and assigning a data path for sending the data to one or more storage devices (step 312). For example, network operating conditions may include information regarding network congestion, workload or queue size and available capacity on various communication links that connect client computers to various storage devices within the storage operation system. In other embodiments, according to one or more storage policies, a data path may be determined by the storage manager based on available storage resources or certain preferences. In other embodiments, a data path between a client computer and a particular storage device may be predetermined by a storage policy or storage manager.

At step 314, based on the determined path between the client computer and storage device (step 312), the storage manager may contact one or more data agents and media agent modules that may be used in the storage operation (e.g., data migration) associated with client data. Once the data agents and media agent modules have been selected by the storage manager (step 314), data may be sent from the client computer or a data volume associated with the client computer to the designated storage device via the media agent (step 316). The sent data from the media agent may be transmitted to the storage device via a plurality of HBA devices that may be configured to provide failover and load balancing operations. For example, based on storage network congestion parameters, a storage manager may configure multiple HBA devices to handle the transfer of data to a storage device.

Figure 4A:
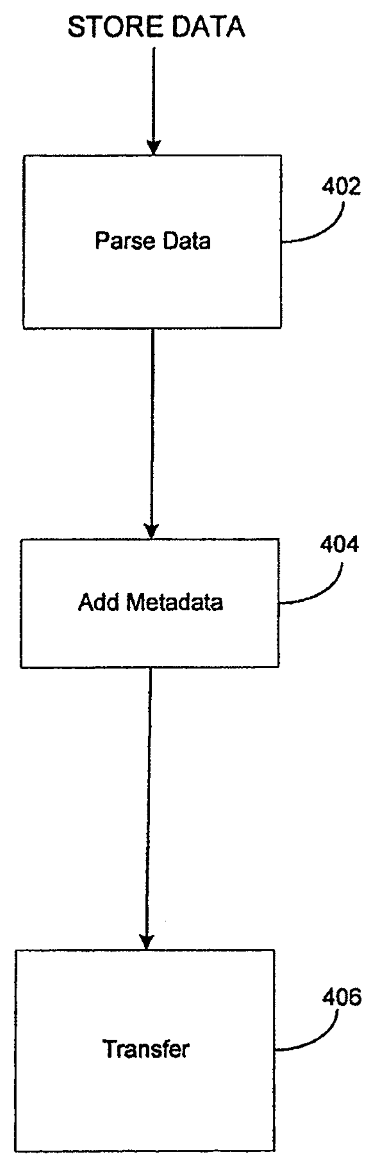
FIG. 4A is a flow diagram of a method of processing electronic data prior to sending the data to one or more storage devices via host bus adapter devices within a storage operation system according to an embodiment of the invention.

FIG. 4A is a flow diagram 400A of a method of processing electronic data prior to sending the data to one or more storage devices via host bus adapter, devices within a storage operation system according to an embodiment of the invention. The present embodiment provides the process steps associated with parsing received data prior to sending the data to a storage device (FIG. 3, step 306).

At step 402, the storage data associated with the client computer may be parsed into smaller data units based on the storage data size. For example, if the storage data on which storage operations are to be performed is relative large or exceeds a given data size threshold, the data may be parsed into data units. Alternatively, if storage resources within a storage operation system may have reached or may be approaching their storage capacities, load balancing may be achieved by parsing the storage data into smaller data units for the purpose of distributing the data units across different storage device. At step 404, once the data units have been created, metadata is created and added to each of the data units, where the metadata may provide the necessary information for retrieving the data units from multiple storage devices and reconstructing the data units back to their original format.

At step 406, each data unit and its respective metadata may be sent, under the direction of a storage manager, to various designated storage devices via media agents and HBA devices. Each media agent responsible for handling data communication between one or more storage device may utilize multiple HBA devices between the media agent and the storage device in order to provide failover, load balancing, and generally speaking, network optimization provisions. Network optimization provisions may, for example, include configuring the HBA devices and media agents for facilitating increased data network traffic flow, as illustrated in the exemplary embodiments illustrated and described in relation to FIGS. 1B, 1C, and 1D. In an alternative example, a plurality of HBA devices may be assigned to a media agent by a storage manager in order to provide increased data buffering of storage data that may have been received from a data source such as a client computer.

Figure 4B:
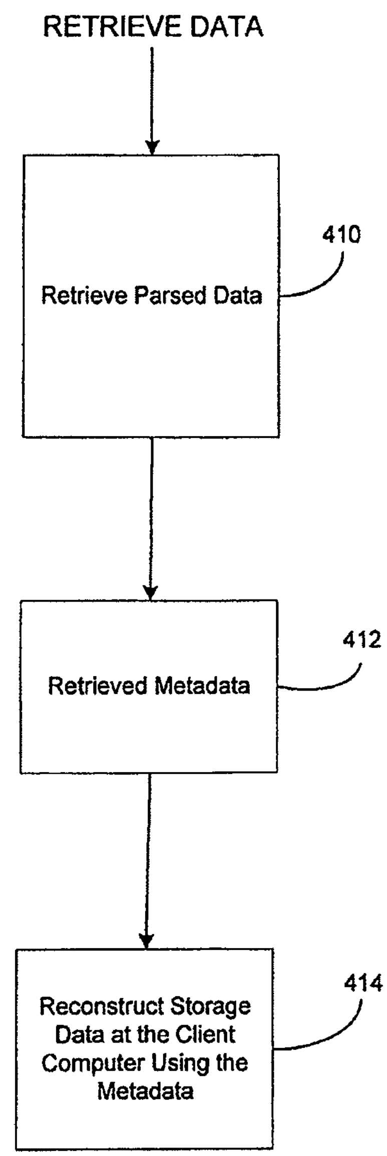
FIG. 4B is a flow diagram of a method of processing electronic data following the retrieval of the data from a plurality of storage devices via host bus adapter devices within a storage operation system according to an embodiment of the invention.

FIG. 4B is a flow diagram 400B of a method of processing electronic data following the retrieval of the data from a plurality of storage devices via host bus adapter devices within a storage operation system according to an embodiment of the invention. At step 410, parsed data units and their respective metadata may be retrieved from various storage devices via different media agents that may have been assigned to each particular storage device. Retrieved data units may be received from each a storage device via one or more HBA devices.

At step 412, the metadata associated with data units may provide the necessary information for enabling the media agents to locate the data units stored across multiple designated storage devices. Once one or more HBA devices associated with these media agents receive the located data units, under the direction of a storage manager, the retrieved data units are then sent to the client computer or data source from which they originated. At the client computer, the data units are assembled using the metadata associated with each of the parsed data units (step 414). The assembled data units may then be restored to their original data format, and may be stored to, for example, a primary storage volume associated with the client computer.

Figure 5:
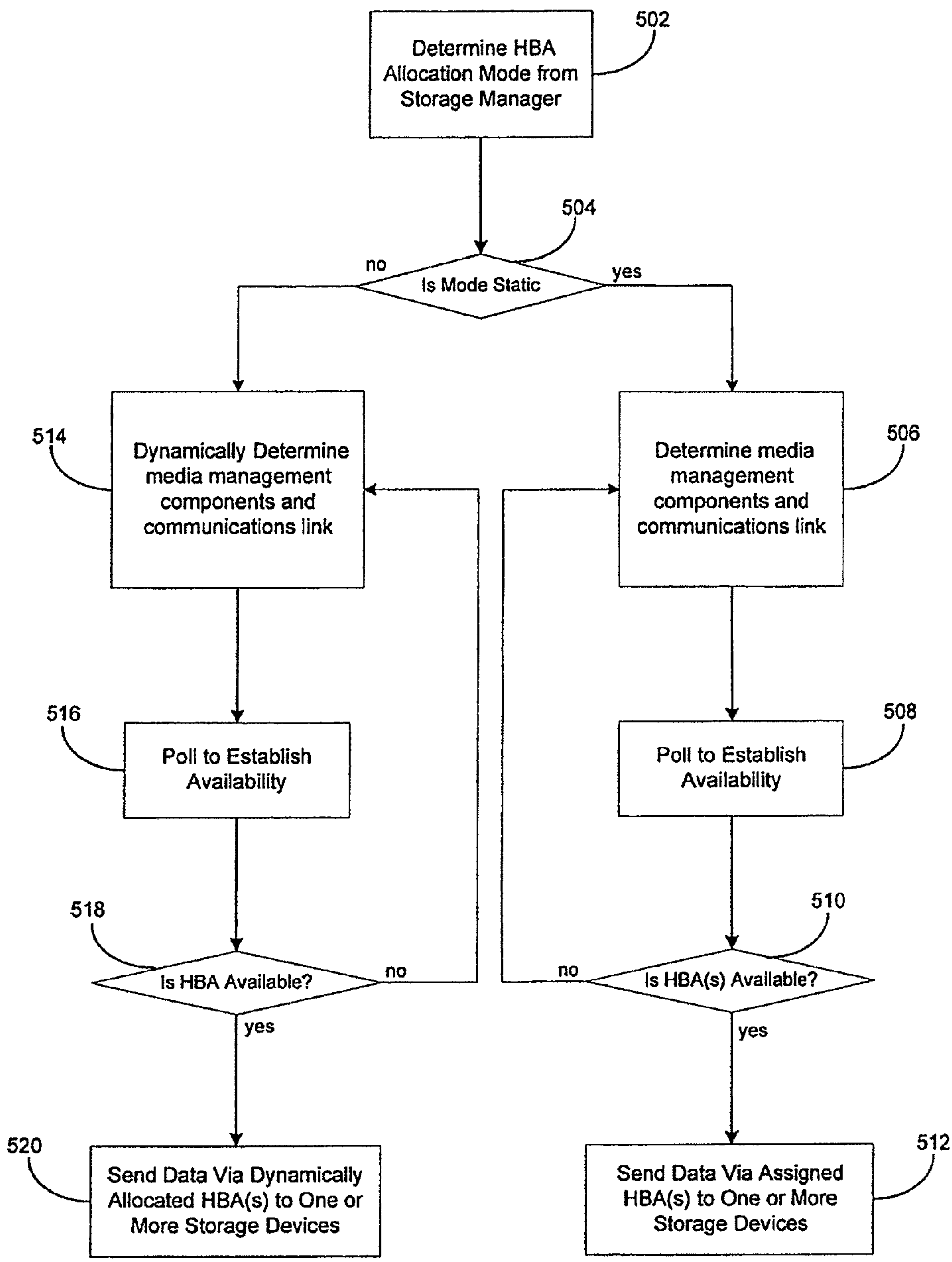
FIG. 5 is a flow diagram of a method of managing the assignment of host bus adaptor (HBA) devices in a storage operation system according to an embodiment of the invention.

FIG. 5 is a flow diagram 500 of a method of managing the assignment of host bus adaptor (HBA) devices in a storage operation system according to an embodiment of the invention. At step 502, the storage manager may determine an allocation mode to be assigned to each of the HBA devices in the storage operation system. The allocation mode may, for example, include either a dynamic allocation mode or a static allocation mode. If it is determined that the allocation mode is a static mode (step 504), under the direction of a storage manager, one or more media agents and their respectively assigned HBA devices are assigned to the client computer participating in a data storage operation. For example, the storage operation may include migrating client computer data from a locally stored primary storage volume to one or more remotely located secondary storage volumes (step 506). In an allocated static mode, the configuration and assignment of HBA devices to media agents is predetermined and stored at the storage manager. For example, referring to FIG. 1A, storage manager 100 may store configuration information associated with the HBA devices 133 assigned to each media agent 105 in its database 111. For client computer 85, database 111 may include an entry specifying a particular storage device or devices 115 to which the data may be migrated or copied to, the media agent 105 associated with these storage devices, and the HBA devices 133 that are assigned to each of the media agents 105 for sending the data between the storage devices 115 and their respective media agents 105.

At step 508, a storage manager or a media agent under the direction of a storage manager may poll the HBA devices assigned to that media agent. If it is determined (step 510) that the one or more HBA devices assigned to the media agent may be unavailable (e.g., due to a network or device failures), the process returns to step 506, where the storage manager may consult network resource information and/or storage policy information in order to reallocate other HBA devices to the media agent. If it is determined (step 510) that the HBA devices are operational, data received from the computer device at the media agent is sent from the media agent via the assigned HBA devices to the one or more designated storage devices used in the storage operation or operations (step 512).

If it is determined that the allocation mode is a dynamic mode (step 504), under the direction of a storage manager, one or more media agents and their respectively assigned HBA devices are dynamically assigned to the client computer participating in a data storage operation based on network operation conditions (step 514). In an allocated dynamic mode, the configuration and assignment of HBA devices to media agents is dynamically determined by the storage manager based on storage network parameters, conditions, and/or storage policies.

Figure 1B:
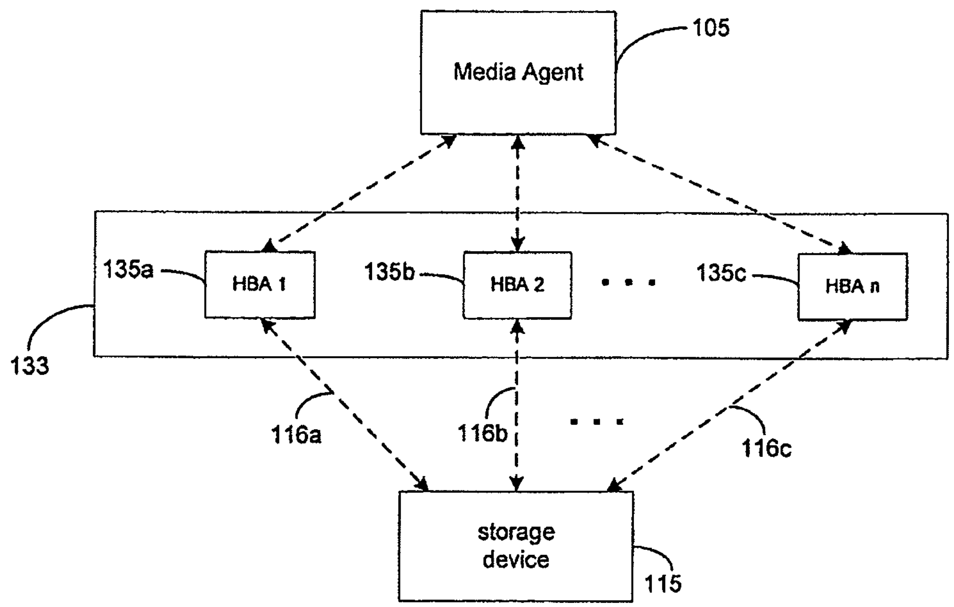
FIG. 1B illustrates the exchange of electronic data between a media agent, host bus adapters (HBA), and a storage device of a storage operation system according to an embodiment of the invention.
Figure 1C:
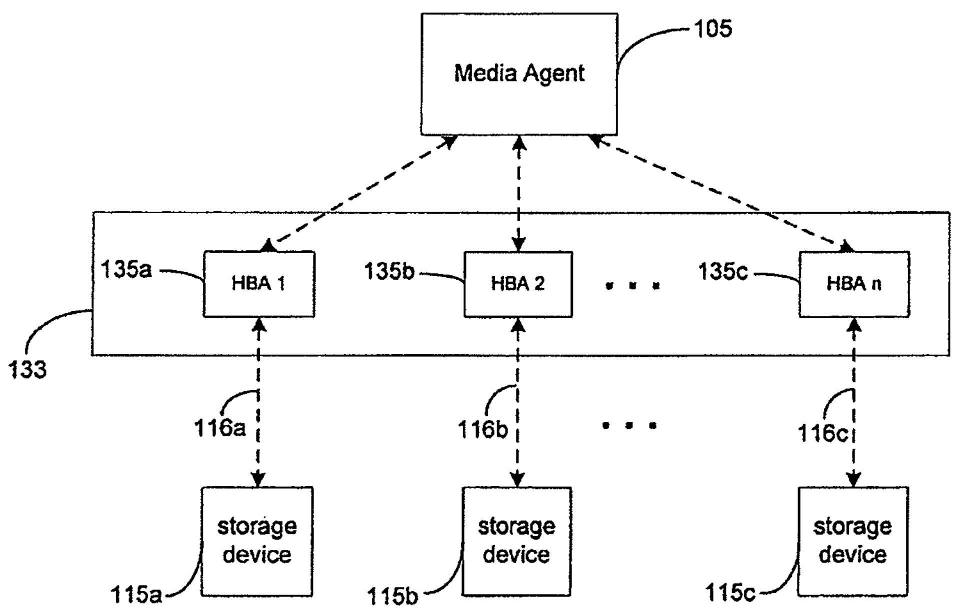
FIG. 1C illustrates the exchange of electronic data between a media agent, host bus adapters (HBA), and storage devices of a storage operation system according to an embodiment of the invention.
Figure 1D:
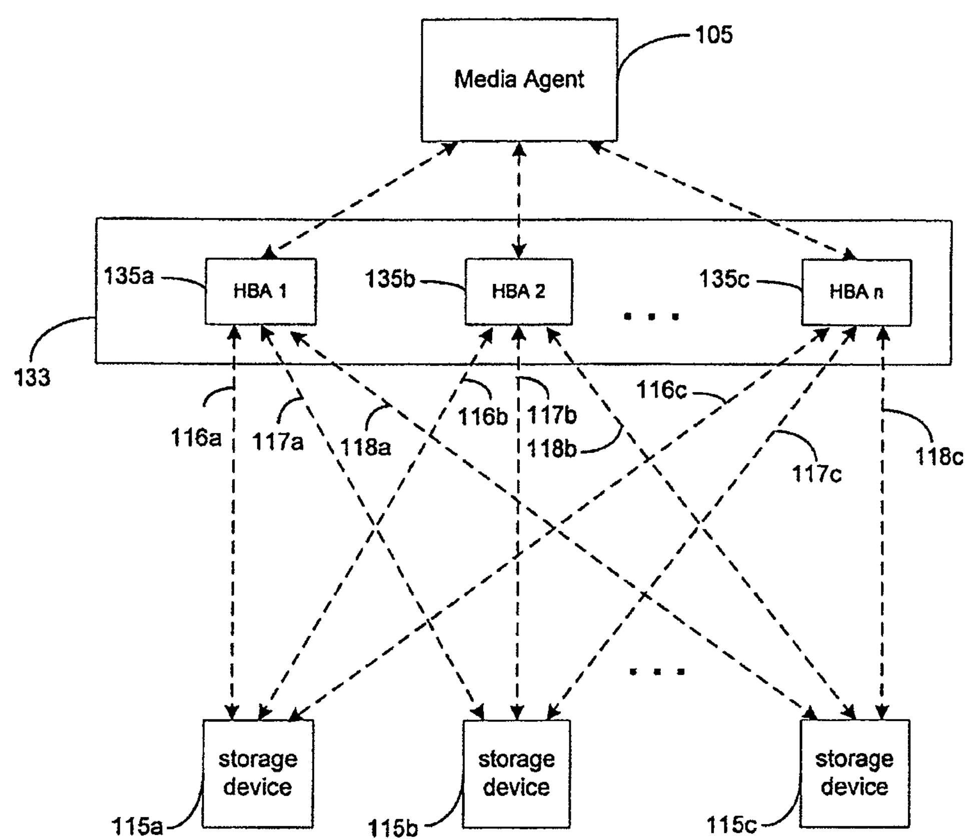
FIG. 1D illustrates the exchange of electronic data between a media agent, host bus adapters (HBA), and storage devices of a storage operation system according to another embodiment of the invention.

For example, referring to FIG. 1A, storage manager 100 may store configuration information associated with the HBA devices 133 assigned to each media agent 105 in its database 111 based on recent performance information associated with the storage operation system. For example, performance information may include, among other things, the available bandwidth associated with the communication links in the storage network, and the available storage space associated with the primary and secondary storage devices. The storage policy information may, for example, include, among other things, scheduling information associated with performing storage operations between particular client computer devices and storage devices within the storage operation system. Thus, based on theses and other parameters, client computer 85 may be dynamically assigned to a particular storage device or storage devices 115 for the purpose of performing a storage operation on the client computer's data, a media agent 105 associated with each of these storage devices 115, and respective HBA devices 133 that are assigned to each of these media agents 105.

At step 516, a storage manager or a media agent under the direction of the storage manager may poll the HBA devices dynamically assigned to that media agent. If it is determined (step 518) that the one or more HBA devices assigned to the media agent may be unavailable (e.g., due to a network or device failures), the process returns to step 514, where the storage manager may consult network resource information and/or storage policy information in order to dynamically reallocate other HBA devices to the media agent based on recent storage network activities. For example, the storage manager may have to determine what media agents, HBA devices, and/or storage devices may be allocated for the storage operation based on which HBA device failed, the existence of available failover capabilities, and/or the availability of storage resources (e.g., a storage device with adequate storage capacity). If it is determined (step 518) that the HBA devices are operational, data received from the computer device at the media agent is sent from the media agent via the allocated HBA devices to the one or more storage devices used in the storage operation or operations (step 520).

Figure 6:
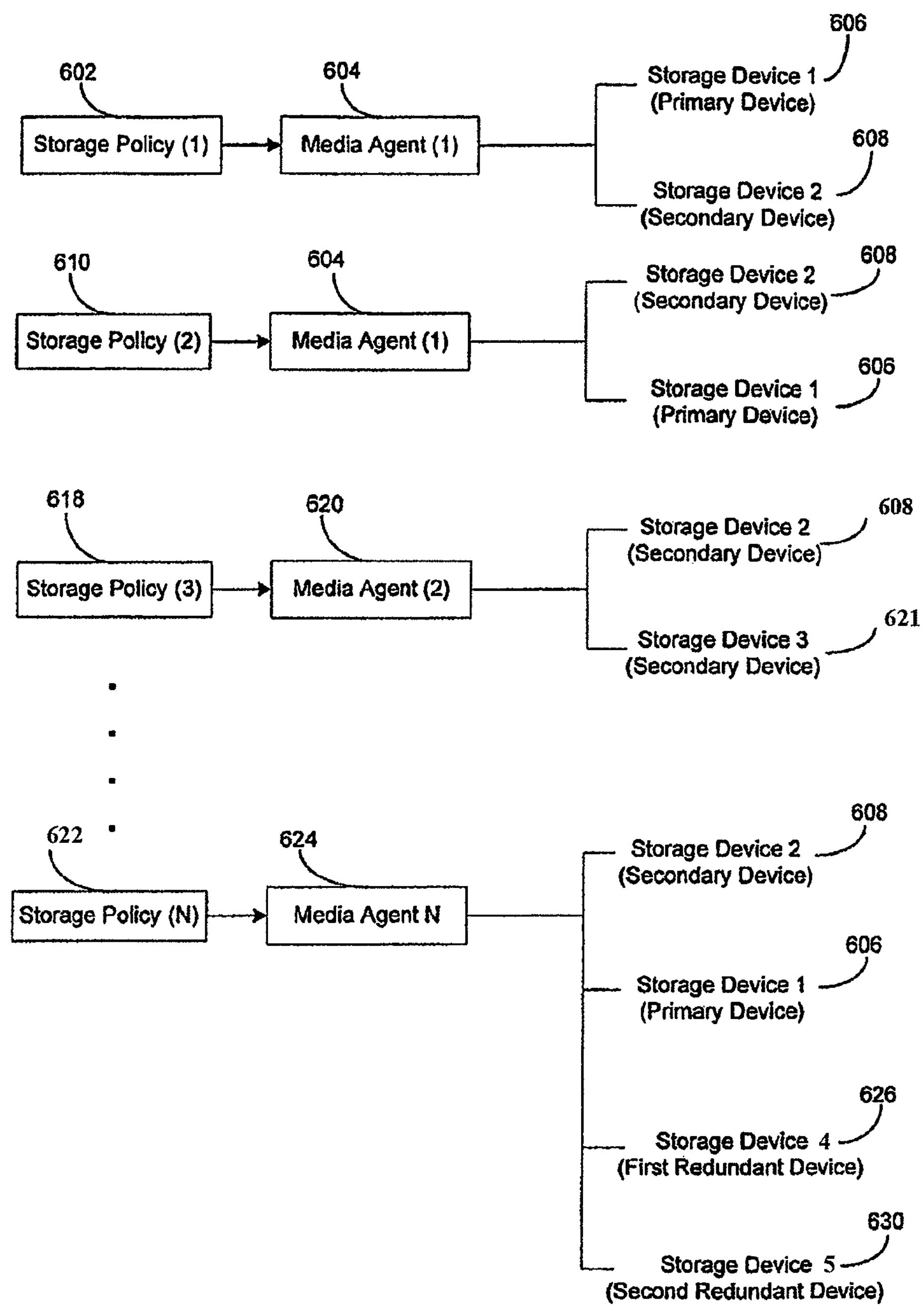
FIG. 6 is a diagram illustrating exemplary storage policies associated with host bus adaptor devices operating within a storage operation system according to an embodiment of the invention.

FIG. 6 is a diagram illustrating exemplary storage policies associated with host bus adaptor devices operating within a storage operation system according to an embodiment of the invention. For example, storage policy 602 may be associated with media agent 604. Based on the application of policy 602, media agent 604 may perform storage operations on primary storage device 606. If, for example, primary storage device 606 becomes unavailable (e.g., due to a device failure or lack of storage capacity), according to policy 602, media agent 604 may alternatively utilize secondary storage device 608 for storage operations. Also, based on storage policy 602, two or more HBA devices may be assigned to media agent 604. For example, media agent 604 may include three HBA devices during storage operations associated with primary storage device 606 and include two HBA devices for storage operations concerning secondary storage device 608.

Storage policy 610 may also be associated with media agent 604, where based on the application of policy 610, media agent 604 may perform storage operations on secondary storage device 608. If, for example, secondary storage device 608 becomes unavailable (e.g., due to a device failure or lack of storage capacity), according to policy 610, media agent 604 may alternatively utilize primary storage device 606 for storage operations. Also, based on storage policy 610, two or more HBA devices may be assigned to media agent 604. For example, according to storage policy 610, media agent 604 may include three HBA devices during storage operations associated with secondary storage device 608 and include two HBA devices for storage operations concerning primary storage device 606.

According to another embodiment, storage policy 618 may, for example, be associated with media agent 620. Based on the application of policy 618, media agent 620 may perform storage operations on secondary storage device 608. If, for example, secondary storage device 608 becomes unavailable (e.g., due to a device failure or lack of storage capacity), according to policy 618, media agent 620 may alternatively utilize secondary storage device 621 for storage operations. Also, based on storage policy 618, two or more HBA devices may be assigned to media agent 620. For example, media agent 620 may include two or three HBA devices during storage operations associated with both secondary storage device 608 and secondary storage device 621. For example, based on the amount of data associated with a given storage operation, the storage manager may assign either two or three HBA devices to send and receive data from secondary storage device 608 and secondary storage device 621. For congested storage operation system networks or high data volume storage operations, three HBA devices may be used according to policy 618.

According to yet another embodiment, storage policy 622 may, for example, be associated with media agent 624. Based on the application of policy 622, media agent 624 may perform storage operations on secondary storage device 608. If, for example, secondary storage device 608 becomes unavailable (e.g., due to a device failure or lack of storage capacity), according to policy 622, media agent 624 may alternatively utilize primary storage device 606 for storage operations. Also, based on storage policy 622, two or more HBA devices may be assigned to media agent 624. If, for example, primary storage device 606 also becomes unavailable (e.g., due to a device failure or lack of storage capacity), according to policy 622, media agent 624 may alternatively utilize first redundant storage device 626 for storage operations. If this device also fails or becomes unavailable, second redundant storage device 630 may be made available to media agent 624. According to policy 622, for example, media agent 624 may be assigned to two or more HBA devices based on the storage device used by media agent 624. For example, the storage manager may assign two HBA devices to both secondary storage device 608 and primary storage device 606, whereas three or more HBA devices may be assigned to first and second redundant storage devices 626 and 630.

According to yet another embodiment, storage policy 622 may, for example, be associated with media agent 624. Based on the application of policy 622, media agent 624 may perform storage operations on secondary storage device 608. If, for example, secondary storage device 608 becomes unavailable (e.g., due to a device failure or lack of storage capacity), according to policy 622, media agent 616 may alternatively utilize primary storage device 606 for storage operations. Also, based on storage policy 614, two or more HBA devices may be assigned to media agent 616. If, for example, primary storage device 606 also becomes unavailable (e.g., due to a device failure or lack of storage capacity), according to policy 622, media agent 616 may alternatively utilize first redundant storage device 626 for storage operations. If this device also fails or becomes unavailable, second redundant storage device 630 may be made available to media agent 624. According to policy 622, for example, media agent 624 may be assigned to two or more HBA devices based on the storage device used by media agent 624. For example, the storage manager may assign two HBA devices to both secondary storage device 608 and primary storage device 606, whereas three or more HBA devices may be assigned to first and second redundant storage devices 626 and 630.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of allocating data in a storage system, the method comprising:

performing with a media agent, a storage operation that transfers data from at least a first storage device to at least a second storage device, the media agent communicates with the first storage device via at least a first communications path and the media agent communicates with the second storage device via at least a second communications path;

upon determining that the data associated with the storage operation exceeds a threshold, dynamically associating with the media agent at least a third communication path to a third storage device;

subdividing the data associated with the storage operation into smaller data units based on the transmission capacity of at least the second and third communication paths to perform load balancing;

creating metadata identifying that a first portion of the smaller data units are stored on the second storage device and that a second portion of the smaller data units are stored on the third storage device, wherein the metadata defines how to reconstruct the first and second portions of the smaller data units during retrieval of the data;

performing the storage operation by transmitting with the media agent, based on the metadata the first portion of the smaller data units from the first storage device to the second storage device via the second communications path;

transmitting with the media agent based on the metadata, the second portion of the smaller data units from the first storage device to the third storage device via the third communications path; and retrieving with the media agent, the first and second portions of the smaller data units from the second and third storage devices and reconstructing the first and second portions of the smaller data units based on the metadata.

2. The method of claim 1, further comprising determining availability of host adapter (HBA) devices in the communication paths.

3. The method of claim 1, further comprising moving data to the third storage device after determining that the second storage device no longer has available storage capacity.

4. The method of claim 1 further comprising storing configuration information associated with the communication paths.

5. The method of claim 1, further comprising monitoring an availability of the communication paths during performance of the storage operation.

6. The method of claim 1, further comprising switching from using the second communication path to using a third communication path when the second communication path is determined to become unavailable during performance of the storage operation.

7. A system for allocating data in a storage operation, the system comprising:

a plurality of storage devices;

a media agent that communicates with a first storage device via at least a first communications path and communicates with a second storage device via at least a second communications path, wherein the media agent performs at least one storage operation that transfers the data from at least the first storage device to at least the second storage device, the media agent communicates with the first storage device via at least the first communications path and the media agent communicates with the second storage device via at least the second communications path; and one or more modules executing in one or more computer processors, configured to:

upon determining that the data associated with the storage operation exceeds a threshold, dynamically associate with the media agent at least a third communication path to a third storage device, the one or more modules being further configured to:

subdivide the data associated with the storage operation into smaller data units based on the transmission capacity of the second and third communication paths; and create metadata identifying that a first portion of the smaller data units are stored on the second storage device and that a second portion of the smaller data units are stored on the third storage device, wherein the metadata defines how to reconstruct the first and second portions of the smaller data units during retrieval of the data, wherein the media agent performs the storage operation based on the metadata by transmitting the first portion of the smaller data units to the second storage device via the second communications path, the media agent transmits, based on the metadata the second portion of the smaller data units to the third storage device via the third communications path, and the media agent retrieves the first and second portions of the smaller data units from the second and third storage devices and reconstructs the first and second portions of the smaller data units based on the metadata.

8. The system of claim 7, wherein the one or more modules determine availability of HBA devices in the communication paths.

9. The system of claim 7, wherein the one or more modules select a fourth storage device if the third communication path associated with the third storage device is unavailable.

10. The system of claim 7, wherein the one or more modules monitor an available storage capacity of the second storage device.

11. The system of claim 7, further comprising moving data to the third storage device after determining that the second storage device no longer has available storage capacity.

12. The system of claim 7 wherein the communication paths have configuration information associated therewith.

13. The system of claim 7, wherein at least one of the modules is configured to monitor an availability of the communication paths during performance of the storage operation.

14. The system of claim 7, wherein at least one of the modules is further configured to switch from using the second communication path to using the third communication path when the second communication path is determined to become unavailable during performance of the storage operation.

* * * * *